United States Patent
Baron et al.

(10) Patent No.: US 10,945,018 B2
(45) Date of Patent: Mar. 9, 2021

(54) SYSTEM AND METHOD FOR DISPLAY ADJUSTMENTS BASED ON CONTENT CHARACTERISTICS

(71) Applicant: NETGEAR, Inc., San Jose, CA (US)

(72) Inventors: Or Baron, New York, NY (US); Jerry Hu, New York, NY (US); Jordan Cooperman, Brooklyn, NY (US); Poppy Simpson, Brooklyn, NY (US); Vladimir Vukicevic, New York, NY (US)

(73) Assignee: NETGEAR, INC., San Jose, CA (US)

( * ) Notice: Subject to any disclaimer, the term of this patent is extended or adjusted under 35 U.S.C. 154(b) by 16 days.

(21) Appl. No.: 16/225,013

(22) Filed: Dec. 19, 2018

(65) Prior Publication Data

US 2019/0124387 A1  Apr. 25, 2019

Related U.S. Application Data

(63) Continuation-in-part of application No. 14/673,927, filed on Mar. 31, 2015.

(Continued)

(51) Int. Cl.
*H04N 1/00* (2006.01)
*H04N 21/422* (2011.01)
(Continued)

(52) U.S. Cl.
CPC ....... *H04N 21/42202* (2013.01); *G06F 3/147* (2013.01); *G06F 16/9017* (2019.01); *G09G 5/02* (2013.01); *G09G 5/10* (2013.01); *G09G 2320/0233* (2013.01); *G09G 2320/0626* (2013.01); *G09G 2320/0666* (2013.01); *G09G 2320/0673* (2013.01); *G09G 2320/103* (2013.01); *G09G 2360/14* (2013.01); *G09G 2360/144* (2013.01); *G09G 2370/16* (2013.01); *H04N 1/00835* (2013.01)

(58) Field of Classification Search
CPC ....................... G09G 2360/14; H04N 1/00835
See application file for complete search history.

(56) References Cited

U.S. PATENT DOCUMENTS

| 8,965,460 B1* | 2/2015 | Rao ........................ G06F 3/005 455/566 |
| 2015/0070594 A1* | 3/2015 | Trachtenberg ........... H04N 5/64 348/841 |
| 2015/0145883 A1* | 5/2015 | Marti ...................... G06T 11/00 345/592 |

* cited by examiner

*Primary Examiner* — Matthew Salvucci
(74) *Attorney, Agent, or Firm* — Bechen PLLC; Timothy J. Bechen

(57) ABSTRACT

A system and method provides for adjusting an output display on a display device including receiving a plurality of images representing visual artworks from a networked data storage location and storing the plurality of images in a local memory device. In a stationary picture frame, the method and system includes detecting at least one ambient condition using an environmental sensor affixed to the stationary picture frame and analyzing the ambient condition to determine ambient condition factors. The method and system includes selecting one of the plurality of images from the local memory device, the selected image having content data and characteristic data and analyzing the characteristic data of the selected image. Thereby, the method and system provides for adjusting display settings on an output display of the stationary picture frame displaying the content data of the selected image on the output display.

18 Claims, 9 Drawing Sheets

Related U.S. Application Data

(60) Provisional application No. 62/608,701, filed on Dec. 21, 2017, provisional application No. 61/972,643, filed on Mar. 31, 2014.

(51) Int. Cl.
| | |
|---|---|
| *G09G 5/10* | (2006.01) |
| *G06F 16/901* | (2019.01) |
| *G09G 5/02* | (2006.01) |
| *G06F 3/147* | (2006.01) |

| TITLE | THE ADORATION OF THE MAGI |
|---|---|
| ARTIST | GIOVANNI BATTISTA TIEPOLO |
| COLOR/BW | COLOR |
| STYLE | OIL ON CANVAS |
| CREATION | 18$^{TH}$ CENTURY |
| LOCATION | METROPOLITAN MUSEUM OF ART / NEW YORK |
| LAYOUT | PORTRAIT |
| HISTORICAL TRAIT | MUTED BACKGROUND |
| CONTENT | PERSONS |
| CONTENT | ARCHITECTURE |

FIG. 16

| TITLE | MEURAL CANVAS MONET-245 |
|---|---|
| LOCATION | LIVING ROOM |
| AMBIENT LIGHT | BRIGHT |
| DISPLAY TYPE | LED |
| SOUND | NO |
| TOUCHSCREEN | YES |
| COLOR SAT. | 50% |
| BRIGHTNESS | 36% |
| POWER | CONTINUOUS |
| SLEEP MODE | NO |

FIG. 17

SYSTEM AND METHOD FOR DISPLAY ADJUSTMENTS BASED ON CONTENT CHARACTERISTICS

RELATED APPLICATIONS

The present application relates to and claims priority to U.S. Provisional Patent Application Ser. No. 62/608,701 filed Dec. 21, 2017. The present application is also a continuation-in-part of and claims priority to U.S. patent application Ser. No. 14/673,927 filed Mar. 31, 2015 entitled "SYSTEM AND METHOD FOR OUTPUT DISPLAY GENERATION BASED ON AMBIENT CONDITIONS," which relates to and claims priority to U.S. Provisional Patent Application Ser. No. 61/972,643 filed Mar. 31, 2014.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The disclosed technology relates generally to graphical display technology and more specifically to determining environmental factors and generating an output display based on the environmental factors.

BACKGROUND

Existing technology provides for digital picture frames looping electronic images. These digital picture frames include a small microprocessor with limited processing technology and a memory device. The microprocessor includes functionality for advancing and transitioning between images.

Advancements in the digital picture frame technology include improvements in loading images into the local memory. For example, current techniques allow for wireless connectivity, such as a Bluetooth or streaming.

Existing technology suffers from a disconnect between environmental factors/conditions and output content. The output on an electronic screen is predicated on the user's select engagement of content. Thus, existing display technology is based on user selection of content.

One form of technology using sensors for display adjustment is a reactive technology for adjusting the quality of content, not the content. Adaptive brightness systems determine the brightness of a particular room and automatically adjust the brightness level of the television display. This adjustment does not relate to type of content, but makes existing content more visible.

Display technology suffers from a lack of varying or optimizing the output based on the content itself. Display technology includes user-controlled adjustments, such as adjusting brightness and contrast. But these adjustments are typically limited to the user's preference or general characteristics. Power saving technology provides another adjustment, an external brightness detector that modifies the output based on the brightness of the room for power savings. Preset display settings, such as "theater" or "sports" settings, are another example.

Existing digital displays do not dynamically consider the characteristics of the content that is being displayed. Therefore, digital displays do not adjust the output settings, such as but not limited to backlight levels, gamma correction, color correction, etc., when outputting content.

Adjustment of the display can lend a higher degree of authenticity to a digital display. For example, a digital display of a painting using general display characteristics can obscure or hide the intricate details and elements of the painting. Current general display technology is lacking the ability to automatically adjust the output display that benefits the content being displayed. This results in decreased quality and consistency of digital displays. Therefore, there exists a need for improved dynamic adjustment of digital displays.

BRIEF DESCRIPTION

The method and system recites a method and system for adjusting an output display on a device. The method and system includes receiving a plurality of images representing visual artworks from a networked data storage location and storing the plurality of images in a local memory device. The images can be from a network location where a user stores or otherwise reserves images available for display on a stationary frame.

The method and system includes, in the stationary frame, detecting at least one ambient condition using an environmental sensor affixed to the stationary picture frame. The ambient condition(s) relate to conditions external to the display, such as for example brightness in a room, number of people, commotion level, wirelessly recognizable computing devices, or any other conditions.

Therein, the method and system includes analyzing the ambient condition to determine ambient condition factors. The ambient condition factors represent computational factors used for understanding the ambient conditions.

The method and system includes selecting one of the plurality of images from the local memory device. The selection of image(s) can include pulling the image from the local storage medium for processing and display. Herein, the selected image includes content data and characteristic data. The content data is data representing the image for display and the content data is meta data or other descriptive data relating to features, aspects, or details of the image.

The method and system includes analyzing the characteristic data of the selected image. Therein, the method and system adjusts display settings on an output display of the stationary picture frame based on the characteristic data in relation to the ambient condition factors. The adjustment of display settings can include modifying any suitable setting, such as for example increase or decreasing brightness, contrast, tint, backlight levels, gamma correction, color correction, touchscreen functionality, pixel limitations, etc.

Thereby, the method and system includes displaying the content data of the selected image on the output display.

As used herein, the content data includes any suitable data relating to the content itself, such as but not limited to: type of artwork, original medium, date of original artwork creation, orientation, digitization method, primary color, secondary colors, and tertiary colors.

Further embodiments provides for accessing images from a networked location, including for example a network site having a plurality of images. The network site, such as a social media network allowing for users to maintain a profile and content, includes users designating images available for display.

Thereby, in one embodiment, the method and system includes accessing the network site across a networked connection, the network site having a plurality of available images for download and display. The method and system includes recognizing a network profile and the plurality of images associated therewith, such as for example by recognizing or otherwise communicating with a remote computer or processing device, e.g. a mobile computer device. Therein, the method and system includes retrieving at least a portion of the plurality of images from the network site.

The system and method creates a new platform for presenting images, videos, etc. based on external stimuli. It converts local physical and digital information in order to present a better device for artistic, decorative, informational, and other important purposes. It combines both hardware and software in order to create an integrated and seamless experience.

BRIEF DESCRIPTION OF THE DRAWINGS

FIGS. 16-17 illustrate example of content characteristic data.

A better understanding of the disclosed technology will be obtained from the following detailed description of the preferred embodiments taken in conjunction with the drawings and the attached claims.

DETAILED DESCRIPTION

Embodiments of the disclosed technology provide for detecting ambient conditions relative to a display device, determining an output complementary to the ambient conditions and generating an output on the display device based thereon.

Figure 1:
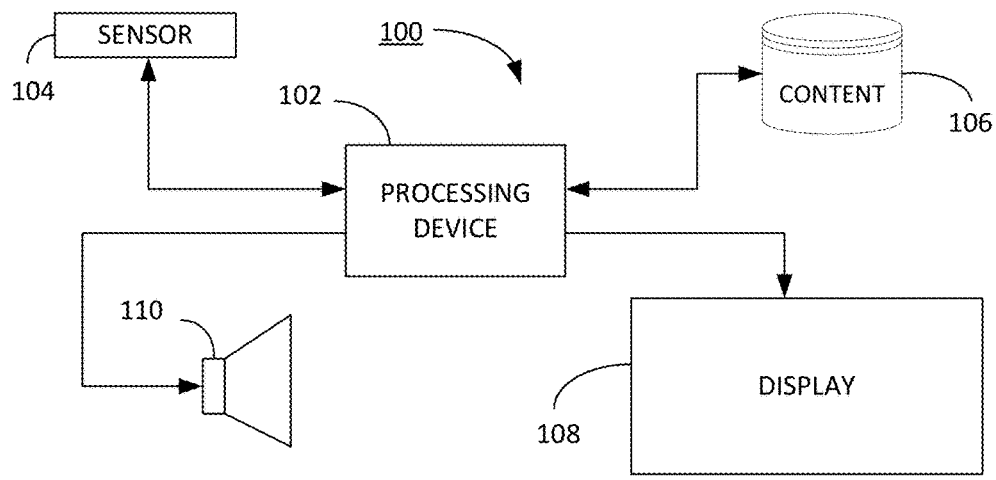
FIG. 1 illustrates a block diagram of a processing system including a display device for generating a display based on ambient conditions.

FIG. 1 illustrates a system 100 including a processing device 102, an environmental sensor 104, database 106, a display 108 and a speaker 110. It is recognized by one skilled in the art, numerous elements known in the art have been omitted for clarity purposes only, for example a power source or connectivity components.

In this embodiment of the system 100, the processing device 102 may be any suitable type of processing device operative to perform processing operations, such as in response to executable instructions. The executable instructions may be stored on a computer readable medium, not expressly illustrated herein. The processing device may be a stand-alone processing component, or operations may be performed in a distributed processing environment. The illustrated processing device 102 represents one or more physical components for performing processing operations as described herein.

The sensor 104 may be any suitable type of sensor allowing for detecting of ambient conditions. As described in further detail below, different sensors provide for detection of different ambient conditions. For example, the environmental sensor may include, but is not limited to, a camera, a motion detector, a light detector, an audio detector and/or microphone, a heat sensor, a wireless signal detector, a Bluetooth signal detector, an electric field sensor for proximity detection and/or gesture-based control, an infrared-based sensor for ambient light detection and/or proximity detection and/or gesture-based control, an ultrasonic transducer sensor for proximity detection and/or gesture-based control, geospatial and/or global positioning sensor, The database 106 may be any suitable memory storage device or devices capable of storing content therein. Illustrated in FIG. 1, the database 106 is directly connected to the processing device 102, such as being embedded or mounted in a processing system. Such illustration is not expressly limiting as the database 106 may be connected via alternative means, such as via a wired or wireless connection, such as a memory device connected via a portal or peripheral connection outlet, a local data storage device accessible via wired or wireless connectivity, or in another embodiment a storage device associated with or internal to another processing device, e.g. smart phone, tablet computer, laptop computer, capable of communication with the processing device 102. For example, the storage 106 may include content such as images, audio files, movies files, etc., stored on a person's mobile device such that the processing device can access and retrieve the content therefrom.

The display device 108 may be any suitable display device, including but not limited to a flat screen television or display consistent with known display technology. The display device 108 may also be a smaller picture frame, such as an electronic picture frame, having the processing device 102 associated therewith.

The speaker 110 may be any suitable speaker and or audio output system recognized by one skilled in the art. The speaker 110 may be part of an audio system or can be an embedded speaker associated with the display 108.

In one embodiment, as described in further detail below, the system 100 may include a central housing having the various elements disposed therein. In further embodiments, different components including the sensor 104, database 106, processor 102, speaker 110 and/or display 108 may be external to the system 100 and engaged via a wired or wireless connection. For example, the functionality of the processing device 102 may be disposed in a remote processor with output functionality to the display 108 via a wireless peripheral-connection device.

In the system 100, the sensor 104 operates to detect ambient conditions. Ambient conditions generally relate to conditions of the environment relative to the sensor and/or display 108. Ambient conditions can include any relevant conditions that can be measured by one or more sensors. For example, an ambient condition may be the number of people within a room and the activity level of those people. This can be determined using a camera or a camera in combination with a motion detector. This can also be determined using a microphone or other audio detection device to determine a number of different voices.

Based on the detection of ambient conditions, the processing device 102 therein performs processing operations to determine ambient condition factors. These ambient condition factors represent estimations of activities or conditions relative to the display 108.

Environmental sensor(s) 104 provide inputs for determining ambient factors based on detecting ambient conditions. Examples of ambient condition factors include but are not limited to quantity of viewers, identity of viewers, viewer proximity, viewer motion, viewer gesture, viewer mood, human sounds, ambient sounds, musical sounds, light quantity, light source, light direction, local temperature, geographic location, etc.

Each ambient condition factor can be informed by one or more of the above specified sensors detecting ambient conditions. The determination of an ambient condition factor can be based on the analysis of the ambient condition.

For example, an ambient condition factor may possess a range of output values that determine the definition of ambient conditions. An example value range for the quantity of viewers may include '1', '2', '3', '4', '5', '6', '7', '8', and '9-or-more' output values. An example value range for the identity of viewers may include 'owner #1', 'owner #2', 'owner #3', 'owner #4', 'owner #5', 'owner #6', 'owner #n+#n', 'multiple owners', 'guest #1', 'guest #2', 'multiple guests', and 'owners+guests' output values. An example value range for the viewer motion ambient factor may include 'none', 'light', 'medium', and 'heavy motion' output values. An example value range for the light quantity ambient factor may include 'none', 'very low', 'low', 'medium', 'high', and 'very high' output values. An example value range for the musical sounds may include 'none', and 'unknown', 'recognized song match' output values. There are numerous other potential ambient conditions and associated ambient condition factor value ranges informed by the various embodiments and combinations of environmental sensors 104.

Based on these ambient condition factors, the processing device therein estimates an ambient condition. Each ambient condition may be informed by one or more ambient factor value ranges. An example of ambient condition 'owner default interacting' would be informed by ambient factors 'quantity of viewers', 'identity of viewers', 'viewer proximity', 'viewer gesture', and potentially more ambient factors. An example of ambient condition 'mixed default party active' would be informed by ambient factors 'quantity of viewers', 'identity of viewers', 'viewer proximity', 'viewer motion', 'viewer gesture', and potentially more ambient factors. An example of ambient condition 'owner mood positive' would be informed by ambient factors 'quantity of viewers', 'identity of viewers', 'viewer proximity', 'viewer gesture', 'viewer mood', and potentially more ambient factors. An example of ambient condition 'two owners recognized song' would be informed by ambient factors 'quantity of viewers', 'identity of viewers', 'viewer proximity', 'viewer gesture', 'musical sounds', and potentially more ambient factors. An example of ambient condition 'mixed owner winter night in New York' would be informed by ambient factors 'quantity of viewers', 'identity of viewers', 'viewer proximity', 'viewer gesture', 'light quantity', 'light source', 'local temperature', 'geographic location' and potentially more ambient factors. There are numerous other potential ambient conditions informed by associated ambient factors informed by the various embodiments and combinations of sensors 104.

In the above example, the large number of individuals in the room and the high ambient noise allows for the processing device to estimate that there is a social gathering in the room, e.g. mixed default party active. Therefore, the processing device, via its operating routine, retrieves video display content consistent with the estimated ambient condition, which in this case may be a selection of images stored in the database 106. In one embodiment, a user may preload images within the database 106 including tags or other identifiers usable for selection based on determined ambient conditions.

It is noted, further exemplary embodiments are described herein, including further embodiments with sensors 104 and ambient conditions.

Figure 2:
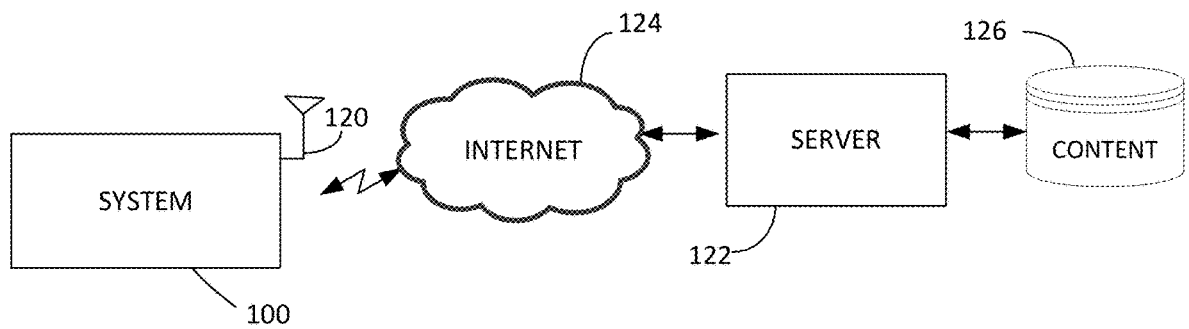
FIG. 2 illustrates a block diagram of a processing system of FIG. 1 in networked communication.

Whereas FIG. 1 illustrates an inclusive system 100, FIG. 2 illustrates the system 100 having networked connection. In FIG. 2, the system 100 includes a wireless transmitter 120 for communication with a server 122 via a networked connection 124, such as the Internet. The server 122 is connected to a network database 126.

The connectivity of FIG. 2 is illustrated as wireless via transmitter/receiver 120, but it is recognized that wired connectivity to a router is within the scope of the system and method. Furthermore, the connectivity of FIG. 2 is not expressly restricted to a direct connection from the system 100, as routing of Internet-based connectivity may be between a local wireless router, a base station, a private network or any other suitable means.

The server 122 may be any suitable network-based processing system accessible via a networked connection. Such connectivity may include login or authentication operations, consistent with techniques recognized by those skilled in the art. The server 122 may include functionality described above regarding processing device 102, such that the processing operations are offloaded to a processor associated with the server 122. The server 122 may include one or more processing devices in a centralized or distributed processing environment.

The database 126 may be one or more data storage devices accessible via the networked connection. The database 126 may include data storage associated with a particular user, or in another embodiment may be a generalized content database or databases. Whereas in FIG. 1 the content for output via the display 108 and/or speaker 110 is retrieved from the local storage 106, the network storage 126 may include a larger library of content. Such content may be user-specific or may be sponsored or directed content. For example, if the ambient conditions indicate a social gathering, the display content may include advertisements for an upcoming festival, concert, event, etc.

The content may also be from public sources, such as content retrieved via tags or metadata associated with the content. For example, the content may be images retrieved from a photo-sharing website or network, audio may be retrieved from a streaming audio service.

FIG. 2 illustrates the embodiment wherein the display system 100 utilizes network interactivity to expand on the content selected and available for display on the display 108 of FIG. 1.

Figure 3:
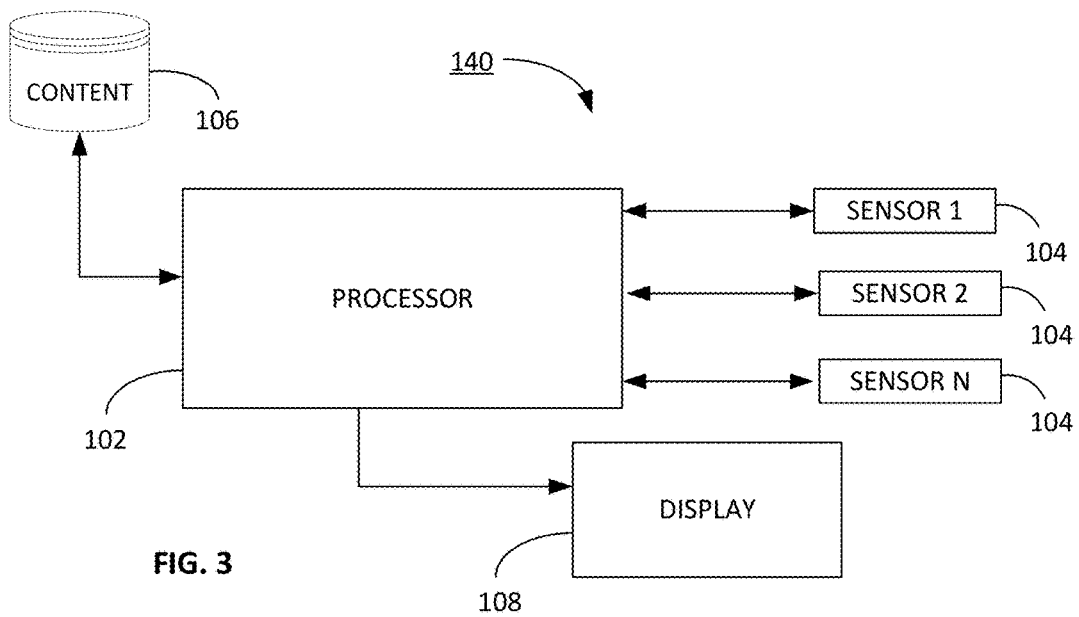
FIG. 3 illustrates a block diagram of one embodiment of a display device processing system.

Whereas the system 100 of FIG. 1 illustrates one sensor 104, FIG. 3 illustrates another embodiment having N number of sensors, where N is an integer value. The system 140 of FIG. 3 includes the processor 102, database 106, display 108, speaker 110 and sensors 142, 144 and 146.

As noted above, the sensor 142, 144 and/or 146 may be any suitable sensor usable to detect ambient conditions. The processor 102, having multiple sensors 142-146 further operates to compile the sensor data to enhance the accuracy of the ambient condition detection. In the above example, the sensor 142 may be a camera detecting five separate individuals in the room and sensor 144 may be a microphone to detect the volume level. Sensor 146 may be a wireless sensor to detect a number of connected devices and determine identity information of people in the room based on the connected device.

In this exemplary embodiment, the connected device may be a smartphone having a social networking application accessible via the smartphone. The sensor 146 may detect the presence of the smartphone based on the smartphone generating a Bluetooth signal or the device seeking wireless connectivity with a local wireless router. Based on proper permissions, the sensor 146 may therein determine the user's identity on a social networking site and access information may available on the social network site. One example may be accessing photos or status updates the user has shared on the site. Another example may be detecting a mood of the user based on any recent posts, including these as ambient conditions.

A network site can include sites also referred to social media or social networking sites, providing for user profile information and specified login credentials. In one example, a user can create a profile on a network site, designating selected images or types/styles of images available for download to the frame. The user may curate their portfolio of available images and can include social aspects with other users, if available. Therein, the frame can wirelessly communicate with the network site for accessing and retrieving designated images for display, as well as an control functions associated therewith.

Figure 4:
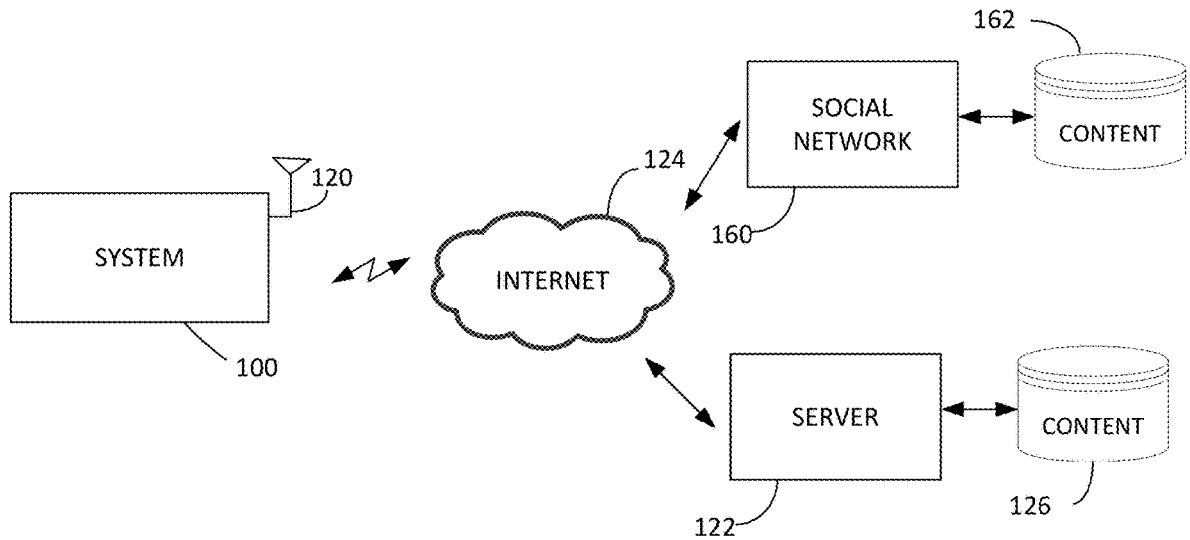
FIG. 4 illustrates another embodiment of a processing system in networked communication.

FIG. 4 illustrates one embodiment of a system for accessing content via a social network. In addition to the system 100 accessing the content server 122 and content database 126 via network 124, FIG. 4 includes a social network 160 having a content database 162 associated therewith.

The social network 160 may be any suitable web-based social networking or content distribution system. The network 160 may include social websites where users post images and/or status updates in a news feed, may include a system where users distribute short messages, may include a system where users submit and distribute images only, where users distribute blogs or other content, by way of example. The network 160 includes a database 162 having content associated therewith, typically associated with a user or tagged content. For example, where a user has a profile on a network site, the database 162 includes the content associated with the profile.

Where permission for content is made available from a user or based on permission levels, the system 100 may therein access and retrieve content for display. In another embodiment, the system 100 having knowledge of a user based on one or more sensors, may use the social network content as another form of to determine ambient condition factors. For example, if a camera as a sensor employs facial recognition and recognizes a user, such as the owner of the system 100, and includes permissions for accessing a social network, the processing device 102 may acquire status information as an ambient condition factor. For example, if the user updates a status to indicate as being recently engaged, this can be an ambient condition whereby the visual display content may include content relating to wedding interests.

Figure 5:
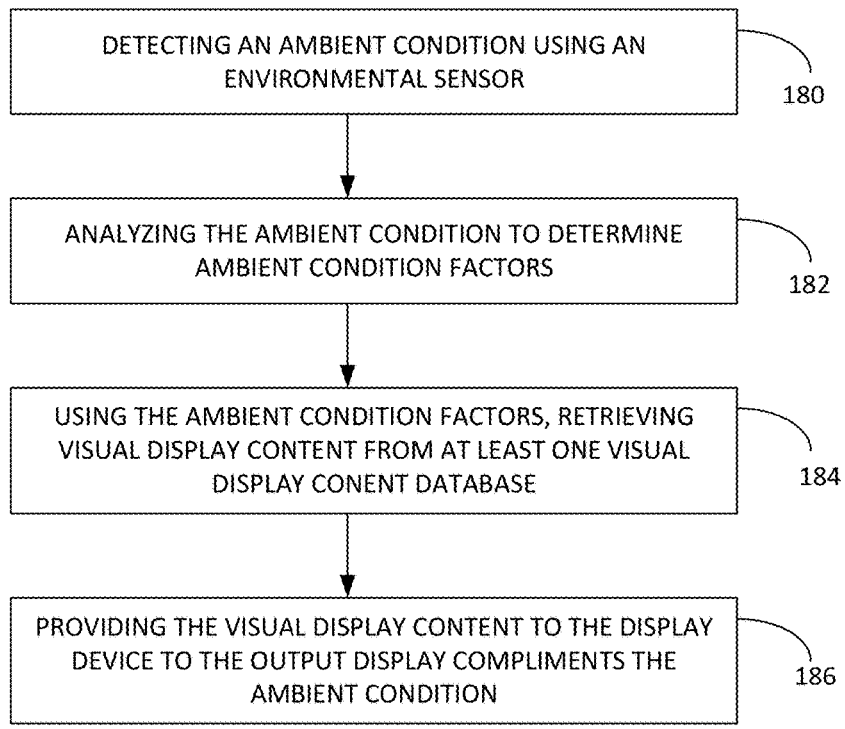
FIG. 5 illustrates a flowchart of the steps of one embodiment of a method for generating an output display on a display device based on at least one ambient condition.

The processing 102 of the system 100 including functionality performed by one or more processing devices. FIG. 5 illustrates the steps of one embodiment of the methodology, as performed by the physical electronic processing devices of FIGS. 1-4.

In the method, a first step, step 180, is detecting an ambient condition using an environmental sensor. This may include sensors 104 as described above. Similarly, the environmental sensor may include processing operations performed by the processor 102 in acquiring information via available sources, such as the networked communication of FIG. 4.

A next step, step 182, is analyzing the ambient condition factors to determine ambient condition. Examples of ambient factors include but are not limited to quantity of viewers, identity of viewers, viewer proximity, viewer motion, viewer gesture, viewer mood, human sounds, ambient sounds, musical sounds, light quantity, light source, light direction, local temperature, geographic location, etc. Each ambient factor can be informed by one or more of the above specified sensors. Based on these ambient condition factors, the processing device therein estimates an ambient condition. Each ambient condition may be informed by one or more ambient factor value ranges.

Step 184 is, using the ambient condition factors, retrieving visual display content from at least one visual content database. As described above, the visual content database may be a local database 106 or can be a network-accessible database 126. The content can be images, videos, advertisements, text, audio or any other suitable content. Content is either automatically or manually tagged with appropriate ambient condition tags. Content is selected for display based on the matching of ambient condition tags with the determined ambient condition.

Step 186 is providing the visual display content to the display device so that the output display compliments the ambient condition. For example, with reference to FIG. 1, the output is displayed on the display 108, which may include audio via the speaker 110. If the ambient conditions detect a single person in the room, the room being dark and no or little movement, the output display may be soothing image with soft music associated with the image, as an example.

Figure 6:
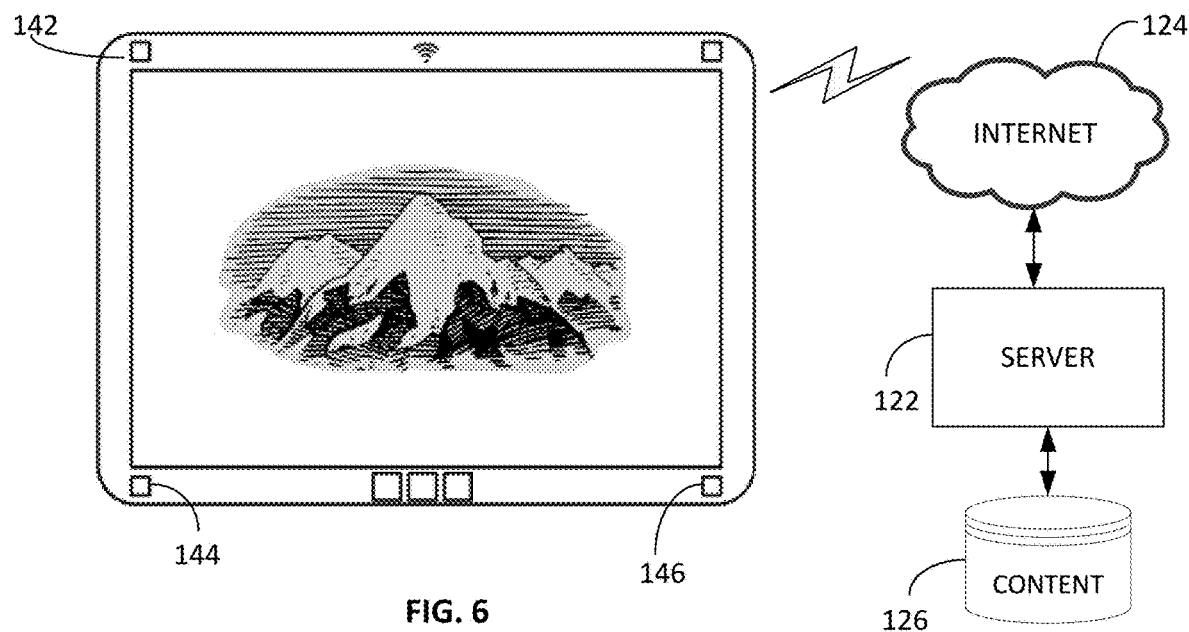
FIGS. 6-9 illustrate representative displays of various embodiments of a display device providing an output based on at least one ambient condition.

FIG. 6 illustrates a graphical display of a display device including multiple sensors, such as noted sensors 142, 144 and 146. Further sensors are within the scope of the display device. The device further includes a wireless connector for connecting to the server 122 via the Internet 124. In this embodiment, the server 122 performs processing operations for determining content from database 126 based on the sensor 142, 144 and/or 146 input. In this embodiment, the sensors may detect little movement, thus proposing a soothing image of a mountain scene.

Another embodiment is using a light sensor, such as detecting brightness, light sources, and/or light consistency from stimuli within the environment of the hardware. Based on light factors, the system leverages local and/or server-stored software to adjust the brightness, contrast, and other display factors in the entire display.

Another embodiment of the sensor data relates to motion detection for detecting motion, shape, and/or size of objects within the environment. Based on motion factors, the system leverages local and/or server-stored software to display environmentally relevant content, e.g. a more soothing and calm image if the environment has little or no motion, a more vibrant and action-filled image if the room is full of multiple motion sources, etc.

Figure 7:
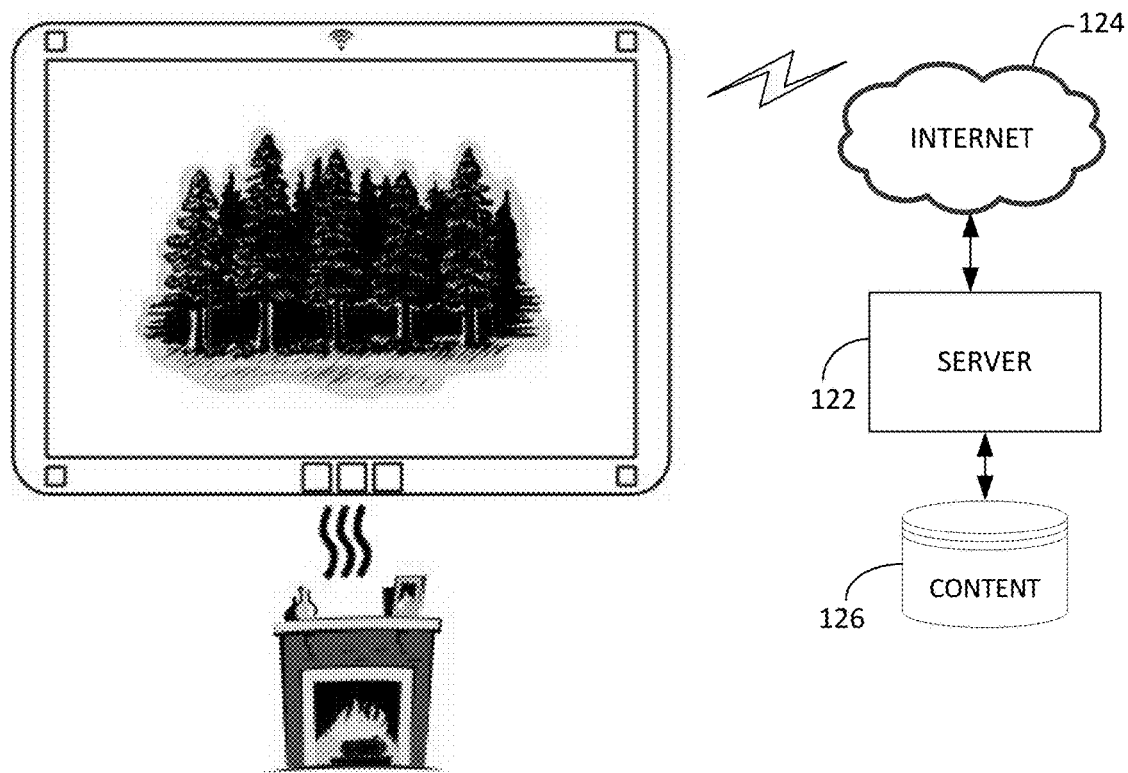

FIG. 7 is a visual representation of the intelligent system for displaying digital visual content responding to heat-based environmental stimuli. In this scenario, the system includes one or more heat sensors for detecting heat sources and temperature within the environment of the hardware. Based on heat factors, the system leverages local and/or server-stored software to adjust the brightness, contrast, and other display factors in the entire display.

Figure 8:
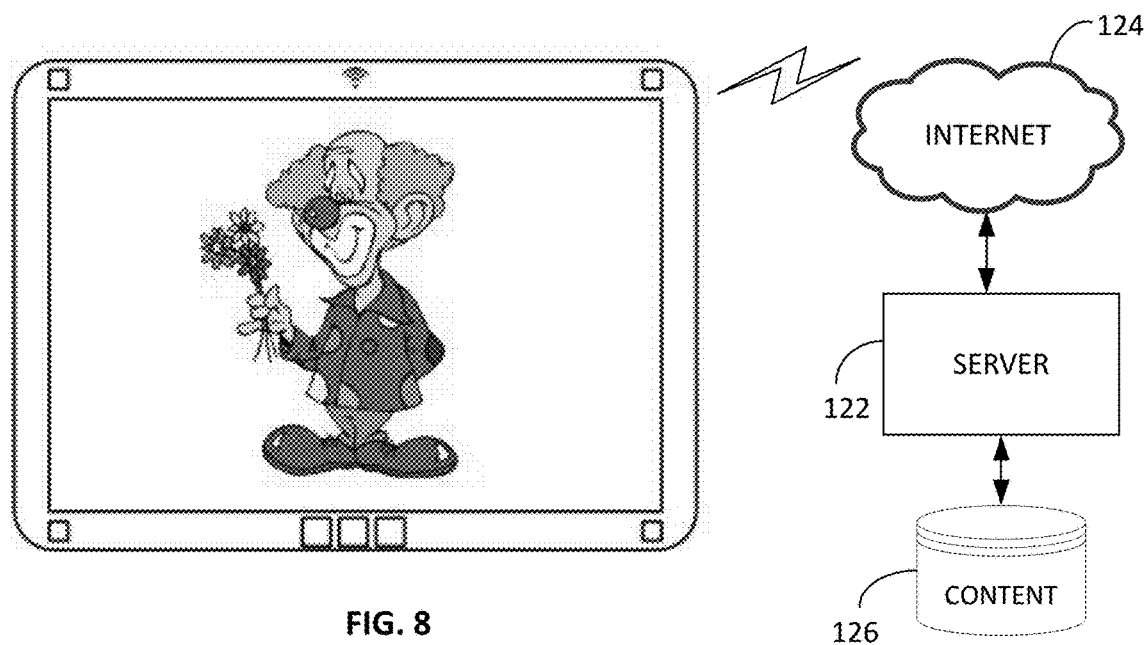

FIG. 8 is a visual representation of the intelligent system for displaying digital visual content responding to mood-based environmental stimuli—i.e. the digital footprint associated with viewer. In this scenario, the system includes capability to collect and interpret mood, emotion, sentiment, intent, and other personal characteristics based on the internet-connected applications utilized by the viewer—e.g. social media software as described above.

Based on social factors, the system leverages local and/or server-stored software to adjust the brightness, contrast, and other display factors in the entire display. The system is further operative to, based on social factors, the leverage local and/or server-stored software to display environmentally relevant content—e.g. a more soothing and calm image if the viewer is expressing anxiety, a more uplifting and positive image if the viewer is expressing sadness, etc. Similarly, the system may acquire content for display based on the social media content available.

Figure 9:
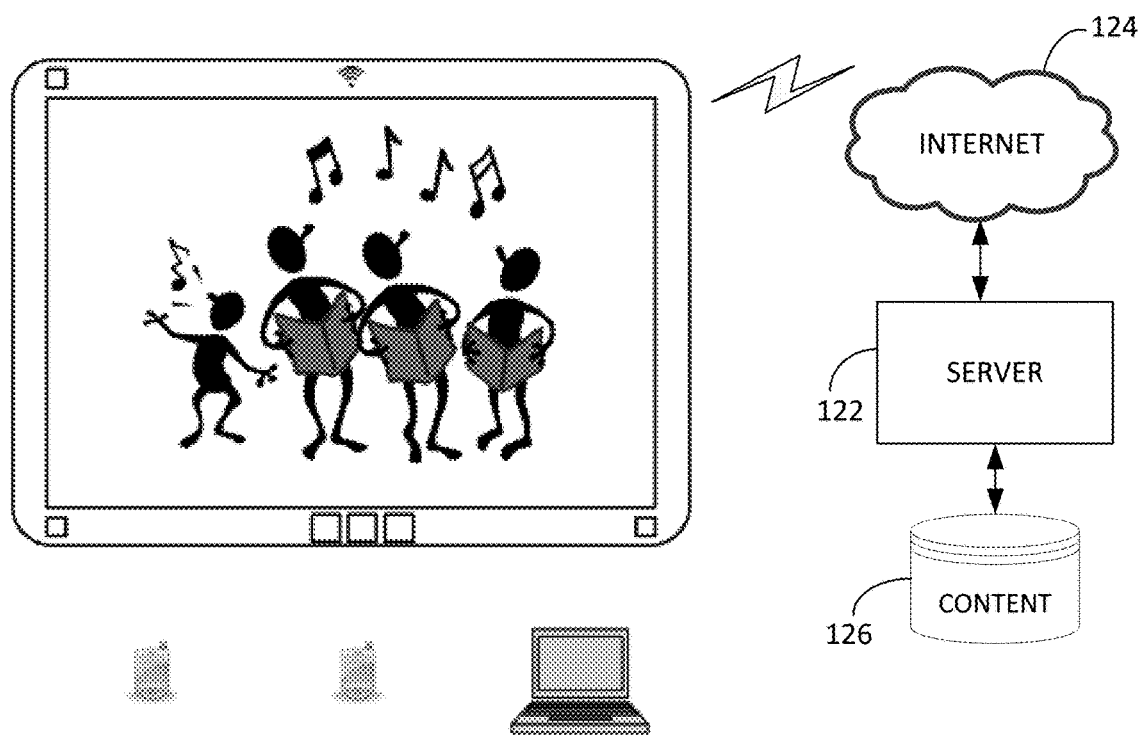

FIG. 9 is a visual representation of the intelligent system for displaying digital visual content responding to multiple devices—i.e. internet-connected stimuli. In this scenario, the system includes capability to recognize and count the number of connected devices within the environment. Based on these devices, the system can determine environmental conditions, such as the number of individuals in the environment, the mood of the users such as via social media, or other factors usable for selecting content.

Figure 10:
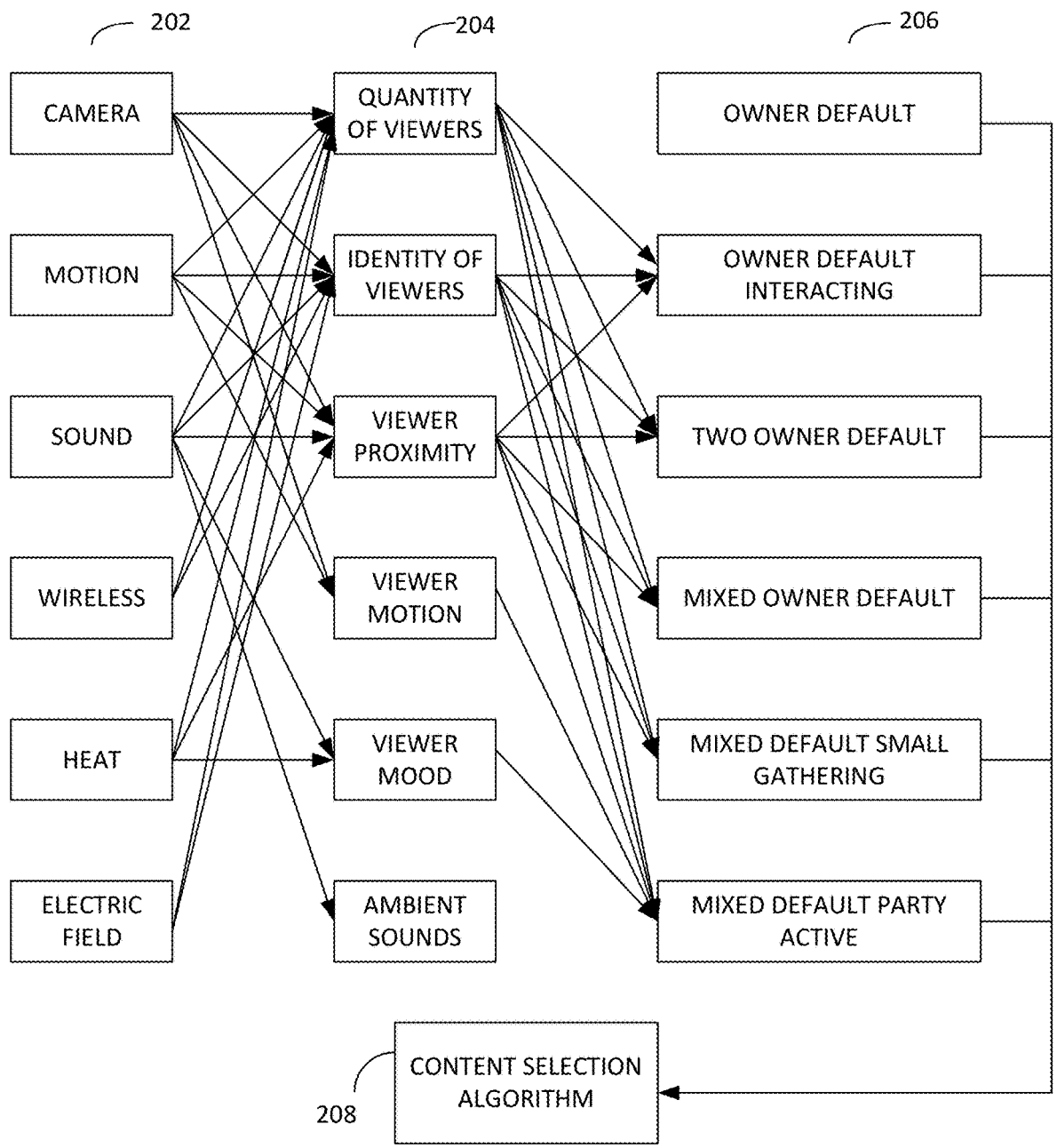
FIG. 10 illustrates a data flow diagram of determining ambient condition factors.

FIG. 10 is a data flow diagram illustrating multiple embodiments of the visual display content selection based on ambient condition factors determined by ambient conditions detected by environmental sensors. The data flow diagram illustrates multiple embodiments, wherein it is recognized these embodiments are illustrative in nature and not limiting in scope. In the example of FIG. 10, there are six exemplary environmental sensors 202: camera; motion; sound; wireless; heat; and electric field. Other examples of sensors include, but are not limited to: light sensor; infrared, ultrasonic, geospatial, and Internet sensors.

The environmental sensors 202 detect ambient conditions using the sensor technology. The data flow diagram of FIG. 10 shows multiple embodiments of the ambient conditions 204 relating to ambient condition factors 206. FIG. 10 illustrates exemplary ambient conditions 204: quantity of viewers; identity of viewers; viewer proximity; viewer motion; viewer mood; and ambient sounds. Other examples ambient conditions include, but are not limited to: viewer gestures; human sounds; musical sounds; light quantity; light source; light direction; local temperature; and geographic location.

Based on these ambient conditions 204, the data flows to one or more ambient condition factors 206, usable for the retrieval of visual display content. Ambient condition factors 206 include, but are not limited to: owner default; owner default interacting; two owner default; mixed owner default; mixed default small gathering; mixed default party active. Other examples include, but not limited to: default condition; owner mood positive; owner mood negative; two owners recognized song; mixed owner winter night in New York, etc.

The ambient condition factors 206 are then usable by the content selection algorithm 208 as noted in the data flow diagram.

One exemplary embodiment illustrated in FIG. 10 includes a motion sensor detecting four ambient conditions: (a) a quantity of viewers; (b) the identity of viewers; (c) proximity of viewers; and (d) the motion of viewers. The electric field sensor detects: (a) quantity of viewers; and (b) the identity of viewers. The ambient conditions are then usable for the determination of the ambient condition factor, such as the ambient condition factor of "two owner default" is based on the ambient conditions of: (a) quantity of viewers; (b) identity of viewers; and (c) viewer proximity.

Figure 11:
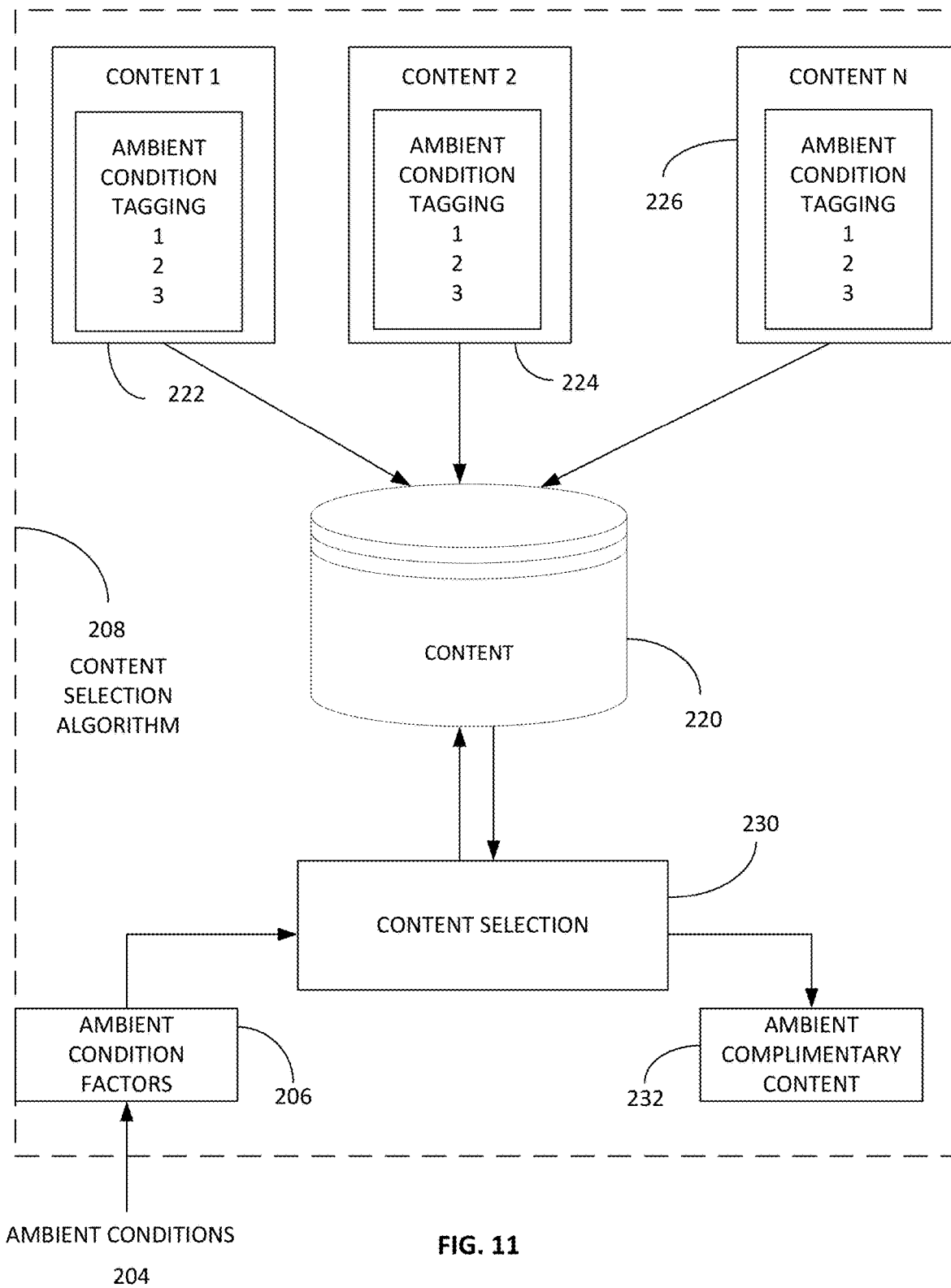
FIG. 11 illustrates a block diagram of one embodiment of a content selection algorithm.

FIG. 11 illustrates one embodiment of the content selection algorithm 208 of FIG. 10. The content selection algorithm operates with a content database 220, the content database including a plurality of content items 222, 224 and 226 by way of example. The content items can include audio and/or video output for display on the display device. For example, the content items may be images and music to compliment the ambient condition of the room as noted by the sensors.

The content itself includes tagging information usable for content selection. In this examples, content 1 222 includes ambient condition tagging 1, 2, and 3. The tags relate to the ambient conditions 206 of FIG. 5, such that the content 222 is usable for designated ambient condition factors. For example, content 1 222 may be designated usable for owner default, two owner default and mixed default small gathering.

A content selection operator 230 received ambient condition factors 206 that are based on the ambient conditions 204. The content selection operator 230 uses the factors 206 in coordination with the content database 220 to retrieve the appropriate content 222, 224 and/or 226. Once this content is received, the ambient complimentary content 232 is therein provided as an output to the display device noted above.

The system for intelligently receiving and displaying digital visual content has the capability to combine the information presented via one or more of the hardware sensors and software sources in any permutation and combination in order to present digital visual content in an environmentally optimized and relevant manner.

The system for intelligently receiving and displaying digital visual content presents digital visual content in an environmentally optimized and relevant manner. It creates a new platform for presenting images, videos, etc. based on external stimuli. It converts local physical and digital information in order to present a better device for artistic, decorative, informational, and other important purposes.

Figure 12:
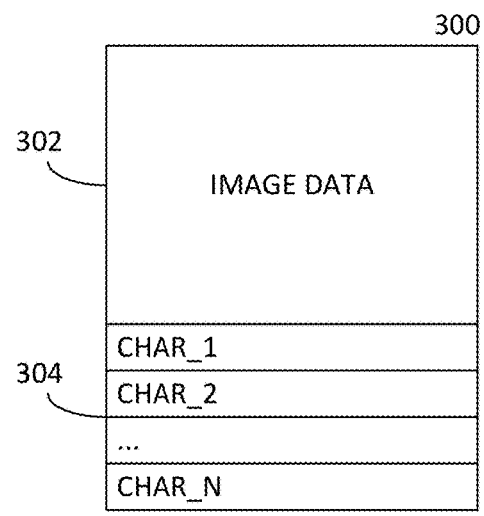
FIG. 12 illustrates a block diagram of one embodiment image and content characteristic data.

FIG. 12 illustrates a block diagram representing a data structure 300 for an image for subsequent display on a display device. This embodiment refers to the data structure as an image, but it is recognized it may be any content including multiple images (e.g. movie), sound, animation, text, graphics, or any other type of data provided for output on an output device. Moreover, the embodiments herein describe a display device, but it is recognized that any suitable device for providing an output may be utilized and the output device is not expressly limited to a screen, projector, or other visual output.

Data block 300 includes two primary data fields, the content data 302 and characteristic data 304. The content data 302 represents the data, in the example of an image, the image information usable by a graphics processor or rendering engine to display the image. For example, if the image is a movie, the content data 302 may be multiple images and encoded information for rendering the sequence of images. Where the content includes audio, the data 302 may include one or more audio tracks associated therewith.

Figure 13:
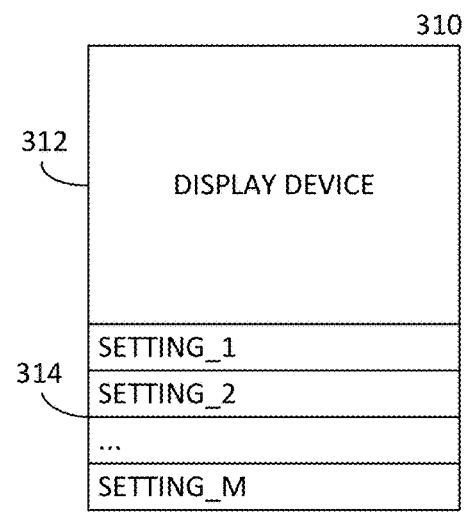
FIG. 13 illustrates a block diagram of one embodiment of display device and setting data.

The characteristic data 304 is one or more data fields having information about the content data 302. As illustrates in FIG. 12, the characteristic data 304 can be any number of data fields, including such exemplary characteristics as: title; artist; data of creation; location of creation; historical traits; original size and shape; portrait or landscape; creator/artist information; original medium; digitization method; primary/secondary/tertiary colors. The above list is exemplary in nature and not expressly limiting, such that the characteristic data can include any other suitable characteristic data as recognized by one skilled in the art.

Where dynamic adjustment of a display is based on the image to be displayed, adjustment also can account for the display device. FIG. 13 illustrates a data block 310, including a display device data field 312 and display settings 314. The display device data field 312 designates the display device. For example, the display device data field 312 may indicate the display is a smart phone touchscreen, a wall-mounted multi-media television, a non-backlit text display, an IPS LCD display, among other displays. In the embodiment where the output includes sound, the data 312 may also indicate sound device such as a particular brand speaker by way of example.

The setting data 314 may be any data indicating the setting characteristics of the display device. By way of example, the setting data 312 may include backlight levels, gamma correction, color correction, cropping, pixel limitations, locations, ambient lighting, touchscreen, touchscreen ability, power type, sound-enabled, display type, etc. The above list is exemplary in nature and not expressly limiting, such that the display data can include any other suitable display data as recognized by one skilled in the art.

Figure 14:
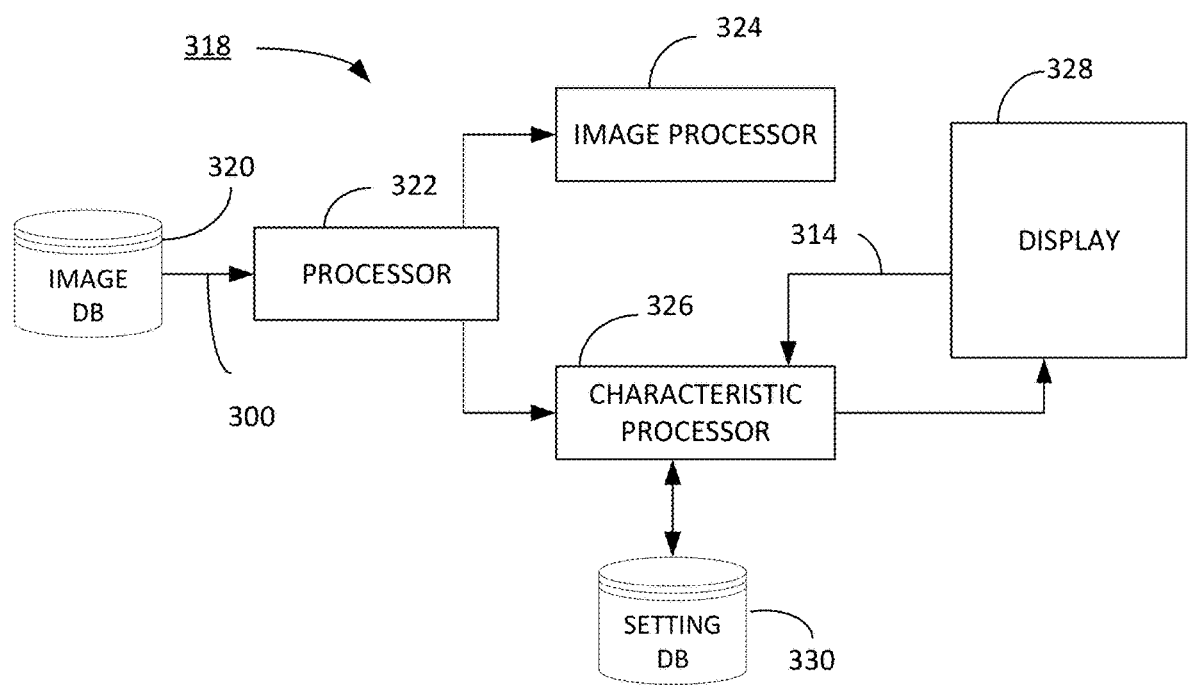
FIG. 14 illustrates a block diagram of one embodiment of a processing system for dynamic adjustment of an output display.

The data field 300 and 310 are usable in a processing environment, such as the system 318 of FIG. 14. The system 318 includes a content data from an image or content database 320, processor 122, an image processor 124, a characteristics processor 326, display 328 and settings database 330. The processors 322, 324 and 326 may be local or networked processing devices for performing processing operations as described herein. In one embodiment, the processors perform processing operations in response to executable instructions (not expressly illustrated). The processors may communicate across local connections, but may also communicate in network interconnectivity, such as across one or more networks. For example, the one or more of the processors may be local to the display 328 and other processors available via a network, cloud or distributed environment.

The display device 328 may be any suitable display device, as recognized by one skilled in the art, including for example a framed stationary and/or wall-mounted flat screen.

The content database 320 and the setting database 330, each may be one or more storage device having data stored therein. These databases 320, 330 may be local, networked or distributed therebetween, including for example minimal local storage with a cloud-based storage of a large library of data, with intermittent updating or synchronizing of data.

The content database 320 includes content 300 for display on the display device 328. For example, if the display is a wall-mounted digital picture frame, the content 300 may include a number of images of works of art. The processor 322 receives the data 300, splitting the image data 302 to the image processor 324 for rendering the image, and the characteristic processor 326 for review and analysis of the characteristic data 304.

Prior to generating a display on the display device 328, the system 318 dynamically adjusts the settings on the display 328. Therefore, FIG. 3 illustrates the characteristics processor 326 receives the display data 310. It is recognized that the display device 328 may not transmit this in every operation, but could preload this data to the processor 326 a first time and available for re-use for each processing of new image data 300.

The characteristic processor 326 therefore includes the characteristic data 304 and setting data 314. The system dynamically generates display settings based on a display modification routine.

For example, the dynamic generation of display settings can be based on designated relationships between the characteristic data 104 and the display setting data 314. In one embodiment, a plurality of look-up tables may be utilized to determine the setting changes. For example, if the image has a characteristic of being a black and white photograph of a nature landscape, and the display device is an LCD display with a high ambient light, the setting may be adjusted to lower the brightness setting. In another example, if the image is an 18th century oil on canvas painting in a landscape orientation and the display device is a computer monitor with portrait orientation, the display settings may include increasing the gamma correction and cropping and resizing the image.

In one exemplary embodiment, a first image is analyzed prior to display. The analysis can include examining any number of available data points relating to the image, including but not limited to: meta data, pixel data, image recognition operation(s), image general values: density, brightness, pixel density, digital watermark, compression data, and/or resampling; and any other data as recognized by one skilled in the art.

In this example, the image may be analyzed to determine it is a color aerial view of a landscape including a high density pixel level, with no digital watermark and a medium high contrast. A processing operation then processes these data points for automated adjustment of the display screen, including in this example slightly lowering the brightness level and increasing the contrast level. The adjustment may also eliminate any potential oversampling due to the high density pixel level. Further adjustments can be made based on either automated functions or user-generated preferences.

The characteristics processor 326 therein provides the dynamic adjustment instruction to the display 328. The display 328 is then modified based on these changes, thus allowing for the output of the image from the image processor 324 in accordance with the settings.

Figure 15:
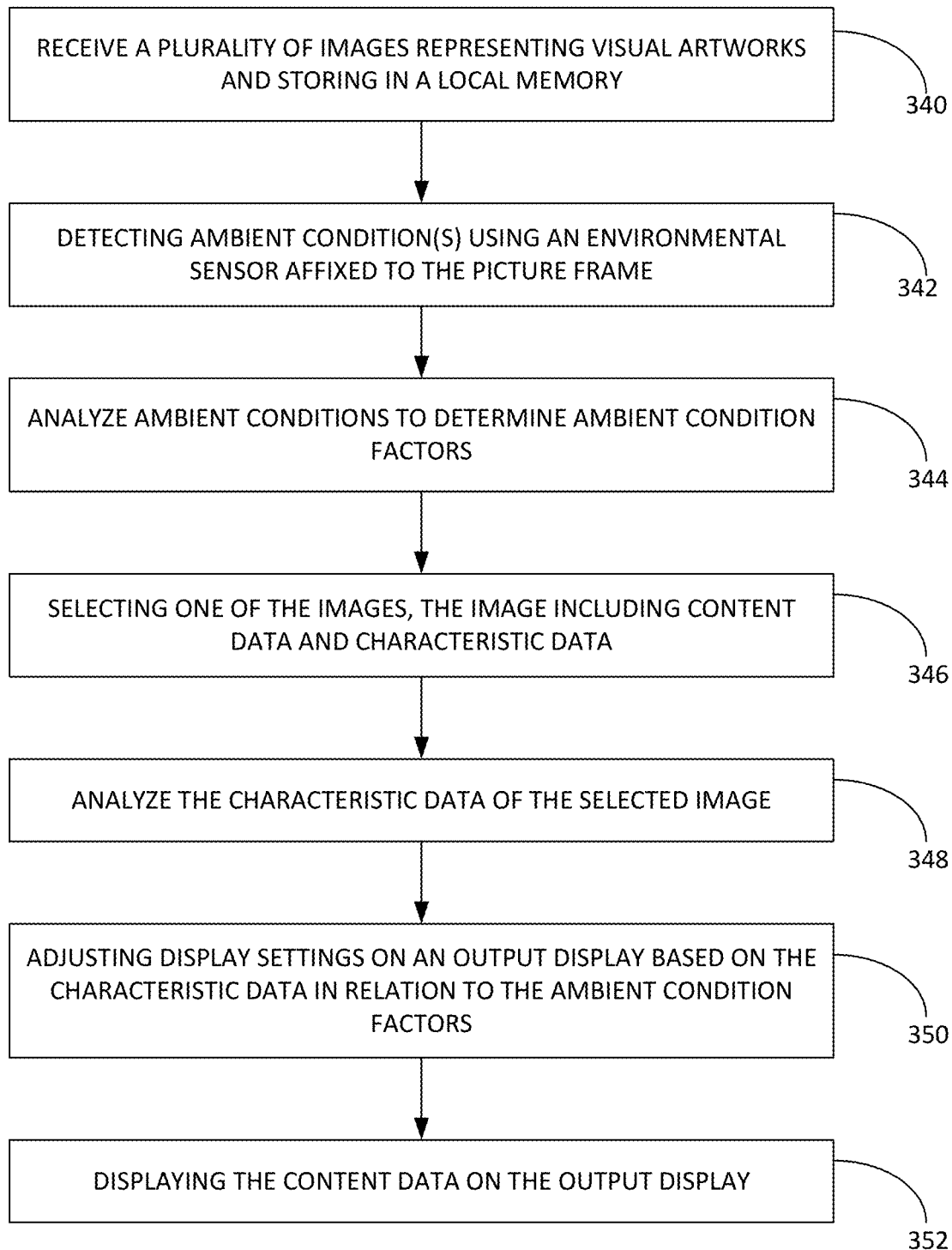
FIG. 15 illustrates a flow diagram of one embodiment of a method for dynamic adjustment of an output display.

FIG. 15 illustrates a flowchart of one exemplary embodiment of a method for dynamic display adjustment of an output display, based on an ambient condition. The method includes, step 340, receiving a plurality of images representing visual artworks and storing these data files in a local memory device. The data files include content data representing the image for display on the output device. In one embodiment the data file also includes characteristic data associated with the image.

Step 342, the method includes detecting ambient condition(s) using an environmental sensor affixed to the picture frame. The detection may be performed using operating techniques described above with response to FIGS. 1-11.

Step 344, the method includes analyzing the ambient conditions to determine ambient condition factors. Similar to step 342, step 344 may be performed using techniques described above.

Step 346, the method includes selecting one of the images from the local memory. As noted above, the image includes content data and characteristic data. In one embodiment, the image may be received in step 340 including the characteristic data.

In another embodiment, a processing operation may be utilized to detect characteristic data based on a review of the content data and any associated meta data. For example, image recognition technology or similar processing techniques can review the image for designating image type, e.g. landscape, portrait of person, portrait of animals, photograph, painting, etc. Thereby, the characteristic data can be generated based on a review of the image, if not predefined or pre-associated with the content data.

Step 348, the method includes analyzing the characteristic data of the selected image. This step can be performed by one or more processing devices to review the data, translate or modify if necessary, or otherwise quantify the data for further processing.

Step 350, the method includes adjusting the display settings on the output display based on the characteristic data in relation to the ambient condition factors. In one embodiment, a processing device may access a look-up table or other reference based on the characteristic data and the ambient condition factors. A processing device includes access to reference information for adjusting these display settings based on settings for improving or optimizing the output.

Step 352, the method includes displaying the content data on the output display. These adjustments therein provide for dynamically improving clarity of the displayed image by adjusting the display settings.

FIG. 16 illustrates a sample data set of image characteristics data for a sample image available for display on a wall-mounted picture frame. In this exemplary embodiment, the characteristic data describes an oil-on-canvas painting entitled "Adoration of the Magi" by Giovanni Battista Tiepolo. The data fields include exemplary data fields that are usable for dynamic adjustment of the display device.

FIG. 17 illustrates a sample data set of display characteristic data for a display. In this example, the display is a Meural® digital canvas located in a living room having an LED display with a high ambient light setting. The exemplary data field includes other data fields that are usable for the dynamic adjustment of the display device.

Therefore, in this example, the environmental sensor can detect an ambient lighting condition, such as a low light environment. The oil-on-canvas painting includes a dark background across the top and multiple images with brightly colored robes. Based thereon, the display settings can include adjusting the brightness and adjusting the contrast on the display screen to optimize the image display.

The above embodiments are described relative to the output of an image or set of images. The present dynamic modification is additionally applicable to varying outputs, including but not limited to: sound-based content; touch-based content; taste-based content; smell-based content; and other output devices such as speakers, virtual or augmented reality, etc.

FIGS. 1 through 17 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

The invention claimed is:

1. A method for adjusting an output display on a display device, the method comprising:
   receiving a plurality of images representing visual artworks from a networked data storage location and storing the plurality of images in a local memory device, wherein the visual artworks are digital representations of paintings;
   in a stationary picture frame, detecting at least one ambient condition using an environmental sensor affixed to the stationary picture frame;
   analyzing the ambient condition to determine ambient condition factors;
   selecting one of the plurality of images from the local memory device, the selected image having content data and characteristic data, wherein the characteristic data includes a plurality of data fields having information about the content data;
   analyzing the characteristic data of the selected image, wherein the characteristic data includes at least one of: type of painting, original medium of the artwork, date of original artwork creation, digitization method of the artwork;
   adjusting display settings on an output display of the stationary picture frame based on the analysis of the characteristic data including an analysis of at least one of: the type of painting, the original medium of the artwork, the date of original artwork creation, and the digitization method of the artwork, in relation to the ambient condition factors; and
   displaying the content data of the selected image on the output display.

2. The method of claim 1, wherein the characteristic data further includes at least one of: primary colors of the content data, secondary colors of the content data, and tertiary colors of the content data.

3. The method of claim 1 further comprising:
generating the characteristic data of the selected image by analyzing the selected image content data.

4. The method of claim 1 further comprising:
retrieving the characteristic data of the selected image from a content database.

5. The method of claim 1, wherein the adjusting the display settings is based on referencing a look-up table using the ambient condition factors and characteristic data.

6. The method of claim 1, wherein the environmental sensor is a light sensor for detecting a brightness level and the adjusting the display settings reflect this brightness level.

7. The method of claim 1, wherein receiving the plurality of images includes:
accessing a network site across a networked connection, the network site having a plurality of available images for download and display;
recognizing a network profile and the plurality of images associated therewith; and
retrieving at least a portion of the plurality of images from the network site.

8. The method of claim 1 wherein the display settings includes at least one of: backlight levels, gamma correction, color correction, touchscreen functionality, and pixel limitations.

9. A system for adjusting an output display, the system comprising:
a stationary picture frame having a display device and an environmental sensor; and
at least on processing device disposed therein, the processing device, in response to executable instructions, operative to:
receive a plurality of images representing visual artworks from a networked data storage location and storing the plurality of images in a local memory device, wherein the visual artworks are digital representations of paintings;
detecting at least one ambient condition using the environmental sensor affixed to the stationary picture frame;
analyzing the ambient condition to determine ambient condition factors;
selecting one of the plurality of images from the local memory device, the selected image having content data and characteristic data, wherein the characteristic data includes a plurality of data fields having information about the content data;
analyzing the characteristic data of the selected image, wherein the characteristic data includes at least one of: type of painting, original medium of the artwork, date of original artwork creation, and digitization method of the artwork;
adjusting display settings on the output display on the display device of the stationary picture frame based on the analysis of the characteristic data including an analysis of at least one of: the type of painting, the original medium of the artwork, the date of original artwork creation, and the digitization method of the artwork in relation to the ambient condition factors; and
displaying the content data of the selected image on the output display.

10. The system of claim 9, wherein the characteristic data further includes at least one of: primary colors of the content data, secondary colors of the content data, and tertiary colors of the content data.

11. The system of claim 9, the processing device further operative to:
generate the characteristic data of the selected image by analyzing the selected image content data.

12. The system of claim 9, the processing device further operative to:
retrieve the characteristic data of the selected image from a content database.

13. The system of claim 9, wherein the adjusting the display settings is based on referencing a look-up table using the ambient condition factors and characteristic data.

14. The system of claim 9, wherein the environmental sensor is a light sensor for detecting a brightness level and the adjusting the display settings reflect this brightness level.

15. The system of claim 9, wherein the processing device in receiving the plurality of images includes:
accessing a network site across a networked connection, the network site having a plurality of available images for download and display;
recognizing a network profile and the plurality of images associated therewith; and
retrieving at least a portion of the plurality of images from the network site.

16. The system of claim 9 wherein the display settings includes at least one of: backlight levels, gamma correction, color correction, touchscreen functionality, and pixel limitations.

17. A method for adjusting an output display on a display device, the method comprising:
receiving a plurality of images representing visual artworks from a networked data storage location and storing the plurality of images in a local memory device, wherein the visual artworks are digital representations of photographs;
in a stationary picture frame, detecting at least one ambient condition using an environmental sensor affixed to the stationary picture frame;
analyzing the ambient condition to determine ambient condition factors;
selecting one of the plurality of images from the local memory device, the selected image having content data and characteristic data, wherein characteristic data includes a plurality of data fields having information about the content data;
analyzing the characteristic data of the selected image, wherein the characteristic data includes at least one of: type of photograph, original medium of the artwork, date of original artwork creation, digitization method of the artwork;
adjusting display settings on an output display of the stationary picture frame based on the analysis of the characteristic data including an analysis of at least one of: the type of painting, the original medium of the artwork, the date of original artwork creation, and the digitization method of the artwork in relation to the ambient condition factors; and
displaying the content data of the selected image on the output display.

18. The method of claim 17, wherein receiving the plurality of images includes:
accessing a network site across a networked connection, the network site having a plurality of available images for download and display;
recognizing a network profile and the plurality of images associated therewith; and retrieving at least a portion of the plurality of images from the network site.

\* \* \* \* \*